(12) United States Patent
Kurimura et al.

(10) Patent No.: US 6,524,009 B1
(45) Date of Patent: Feb. 25, 2003

(54) ROLLING BEARING

(75) Inventors: Tetsuya Kurimura, Kuwana (JP); Tamotsu Kodama, Kuwana (JP); Tsukasa Toyoda, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/694,781

(22) Filed: Oct. 24, 2000

(30) Foreign Application Priority Data

Oct. 29, 1999 (JP) .............................. 11-309925

(51) Int. Cl.[7] .............................................. F16C 19/06
(52) U.S. Cl. ...................... 384/491; 384/513; 384/516; 384/625
(58) Field of Search ................................ 384/492, 625, 384/516, 513, 569, 491

(56) References Cited

U.S. PATENT DOCUMENTS 5,397,188 A * 3/1995 Yoshizuka et al. .......... 384/492
5,520,987 A * 5/1996 Narai et al. ................. 384/625

* cited by examiner

Primary Examiner—Lenard A. Footland
(74) Attorney, Agent, or Firm—Arent Fox Kintner Plotkin & Kahn, PLLC

(57) ABSTRACT

A rolling bearing in which the attainment of excellent current-carrying capability is compatible with cost reduction. The rolling bearing comprises an inner ring, an outer ring, and a plurality of rolling elements arranged between the inner and outer rings, oil films being interposed between the rolling elements and raceway surfaces of the-rings. Here, the inner raceway surface and the outer raceway surface are made coarser to such a surface roughness (Ra=0.1 μm or so) that they come into metal contact wit the rolling elements for electric connection.

4 Claims, 6 Drawing Sheets

| RADIAL LOAD (N) | RADIAL CLEARANCE (μm) | OPERATING TEMPERATURE (°C) | OIL FILM THICKNESS (μm) | |
|---|---|---|---|---|
| | | | INNER-RING SIDE | OUTER-RING SIDE |
| 4.9 | 10 | 60 | 0.195 | 0.201 |
| | 60 | 60 | 0.185 | 0.190 |
| | 10 | 30 | 0.305 | 0.314 |
| | 60 | 30 | 0.289 | 0.297 |

Fig.5

| RADIAL LOAD (N) | RADIAL CLEARANCE (μm) | OPERATING TEMPERATURE (°C) | OIL FILM THICKNESS (μm) | |
|---|---|---|---|---|
| | | | INNER-RING SIDE | OUTER-RING SIDE |
| 4.9 | 10 | 60 | 0.195 | 0.201 |
| | 60 | 60 | 0.185 | 0.190 |
| | 10 | 30 | 0.305 | 0.314 |
| | 60 | 30 | 0.289 | 0.297 |

Fig.9

Archard-Cowking EQUATION $$h^\circ = 0.230\phi^{0.74}\left\{\frac{D_a}{2}(1\mu\gamma)\right\}^{1.148}\left\{\eta_a\lambda n\times 10^6\cdot\cos\alpha\frac{1\pm\gamma}{\gamma}\right\}^{0.74}\left[\frac{9.8E'}{Q_{max}}\right]^{0.074}$$

Grubin EQUATION $$h^\circ = 0.228\left\{\frac{D_a}{2}(1\mu\gamma)\right\}^{1.031}\left\{\eta_a\lambda n\times 10^6\cdot\cos\alpha\frac{1\pm\gamma}{\gamma}\right\}^{0.737}\left[\frac{9.8E'L}{Q_{max}}\right]^{0.091}$$

WHERE:

$h^\circ$ : OIL FILM THICKNESS (mm)
$D_a$ : DIAMETER OF ROLLING ELEMENT (mm)
$\gamma$ : $\dfrac{D_a\cos\alpha}{d_p}$
$\alpha$ : CONTACT ANGLE (°)
$d_p$ : PITCH CIRCLE DIAMETER OF ROLLING ELEMENT (mm)
$\eta_a$ : ABSOLUTE VISCOSITY (Pa·sec)
$\lambda$ : PRESSURE VISCOSITY COEFFICIENT (Mpa-1)
$n$ : NUMBER OF REVOLUTIONS (rpm)
$Q_{max}$ : MAXIMUM ROLLING ELEMENT LOAD (N)
$L$ : EFFECTIVE LENGTH OF ROLLER (mm)
$E$ : YOUNG'S MODULUS (MPa)
$\phi$ : ELLIPTICITY
  INNER RING $\left\{1+\dfrac{1}{76.5}(1-\gamma)\right\}^{-1}$
  OUTER RING $\left\{1+\dfrac{1}{39}(1+\gamma)\right\}^{-1}$
$E'$ : $\dfrac{E}{9.8(1-\sigma^2)}$
$\sigma$ : POISSON'S RATIO $$Ra = \frac{1}{L}\int_0^L |f(x)|\,dx$$

ROLLING BEARING

BACKGROUND OF THE INVENTION

1. Field of the Invention

The present invention relates to a rolling bearing, and more particularly to a rolling bearing which is suited to supporting a photoconductor drum incorporated in information equipment for electrophotographic processing, such as copiers (including digital PPCs and color PPCs) and printers (including color LBPs and color LED printers).

2. Description of the Related Art

FIG. 11 shows the general configuration of an electrostatic transfer copier. In this copier, an electrostatic latent image is formed on a photoconductor drum 21 with electric charges according to the intensity variations of light 22. A developing drum 23 applies toner having a charge of reversed polarity onto the latent image to form a visible image. The visible image is transferred to a sheet of paper fed from a paper feeding unit 24, and the sheet is then forwarded to a fixing unit 25 in which the toner is fixed to the sheet under heat and pressure. The fixing unit 25 is chiefly composed of a fixing roller 26 having a heater thereinside, and a pressure roller 27 arranged in tight contact with the fixing roller 26 in parallel.

In general, the photoconductor drum 21 is rotatably supported at both ends by rolling bearings such as ball bearings and rolling bearings. These bearings tend to be charged by the electrification of the photoconductor drum 21 during the toner application. The bearing charges, if left standing, can affect the charge distributions of the drum and toner in reverse, possibly causing image disorders and the like. Therefore, some type of grounding mechanism is required. As a conventional countermeasure thereto, an independent grounding mechanism has been provided on an end face of the photoconductor drum.

Nevertheless, the provision of an independent grounding mechanism as described above increases the number of parts in the periphery of the photoconductor drum and adds constraints to the design flexibility. On this account, a structure has been proposed in which a current carrying function is added to a bearing itself so as to release the charges to exterior (outer ring side). This structure, however, requires electric connection between the inner and outer rings which are insulated from each other, and therefore necessitates the use of a so-called current-carrying bearing incorporating current-carrying grease, current-currying seals, or other current-carrying parts. The current-carrying bearings have been proposed, for example, in Japanese Utility Model Laid-Open Publication No. 1992-8820, Japanese Patent Laid-Open Publication No. 1999-82492, and Japanese Patent Laid-open Publication No. 1995-71451. All these bearings, however, use special parts or special materials not used in conventional bearings, and therefore cost more.

SUMMARY OF THE INVENTION

In view of the foregoing, an object of the present invention is to provide a rolling bearing having excellent current-carrying capability at low cost.

To achieve the foregoing object, the present invention provides a rolling bearing comprising an inner ring, an outer ring, and a plurality of rolling elements arranged between the inner and outer rings, oil films being interposed between the rolling elements and raceway surfaces of the rings, wherein the inner raceway surface or the outer raceway surface comes into metal contact with the rolling elements for electric connection. This electric connection can be realized, for example, by making either of the raceway surfaces rougher than in ordinary products (surface roughening).

The insulation between the inner and outer rings in an ordinary rolling bearing is ascribable to the interposition of a lubrication oil film between the inner ring and the rolling elements or between the rolling elements and the outer ring. However, a lubrication oil film is indispensable in maintaining favorable bearing functions. Then, either of the raceway surfaces is formed with a surface roughness higher than conventional as mentioned above, so that the inner ring and the rolling elements, or the rolling elements and the outer ring make frequent metal contact with each other. This establishes almost continuous electric connection therebetween, greatly reducing the average resistance of the bearing to realize a current-carrying state. Here, the metal contact occurs only in limited small areas within the entire contact region (favorable lubrication oil films are formed in the remaining majority of areas), and the contacting time is extremely short. Therefore, poor lubrication and other adverse effects resulting from the metal contact can also be avoided. The surface roughening to the rolling contact surface can be achieved in such a way that the grinding step after cutting is omitted or simplified. In this case, the reduction of steps cuts down costs. The grinding step after heat treatment can be omitted to allow color-based discrimination from ordinary articles (unground articles have black surfaces).

Specifically, the present invention provides) a rolling bearing comprising an inner ring, an outer ring, and a plurality of rolling elements arranged between the inner and outer,rings, oil films being interposed between the rolling elements and raceway surfaces of the rings, wherein the inner raceway surface or the outer raceway surface is equal to or higher than 0.1 µm in surface roughness $R_a$. This is considerably higher than a conventional bearing's surface roughness ($R_a$=0.02 µm or so).

The surface roughness $R_a$ employed herein refers to center line average height (JIS B0601). This expresses in micrometer the value given by the equation of FIG. 10, where a portion having a measurement length of L is extracted from a roughness curve along the direction of its center line, and the roughness curve is represented by y=f(x) with the center line of the extracted portion and the direction of longitudinal magnification on the x-axis and the y-axis, respectively. A roughness curve is a curve obtained from a profile curve by a measuring method having the characteristic of removing low frequency components. A center line is such a straight or curved line parallel to an average line that the areas enclosed by this line and the roughness curve become the same at both sides of this line. An average line is a straight or curved line which has the nominal shape of the surface to be measured and is drawn so that the sum of squares of deviations between this line and the profile curve is minimized.

The rolling bearing according to the present invention may be applied to a ball bearing and a roller bearing. In ball-bearing applications, the above-mentioned surface roughness $R_a$ of the inner or outer raceway surface is set so that the surface roughness $R_a$ (µm) and an oil film thickness (µm) calculated by Archard-Cowking equation have a ratio [surface roughness/oil film thickness] of 0.3 or higher. Meanwhile, in roller-bearing applications, the surface roughness $R_a$ of the inner or outer raceway surface is set so that the surface roughness $R_a$ (μm) and an oil film thickness (μm) calculated by Grubin equation have a ratio [surface roughness/oil film thickness] of 0.3 or higher.

The rolling bearings described above are suited to supporting a photoconductor drum in information equipment for electrophotographic processing. Since this type of applications involve mild load conditions and relatively lower revolutions, adverse effects resulting from the metal contact can be avoided.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a table showing the calculations of oil film thickness;

FIG. 9 shows equations of oil film thickness;

DETAILED DESCRIPTION OF THE PREFERRED EMBODIMENTS

Hereinafter, embodiments of the present invention will be described with reference to FIGS. 1 through 8.

Figure 1:
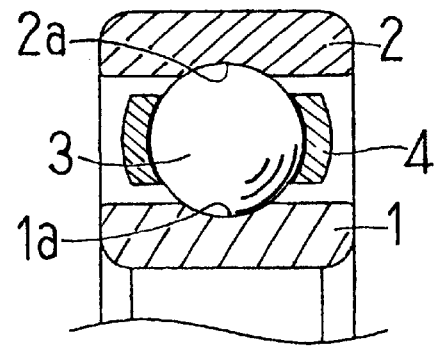
FIG. 1 is a sectional view of a rolling bearing according to the present invention.
Figures 10, 11:
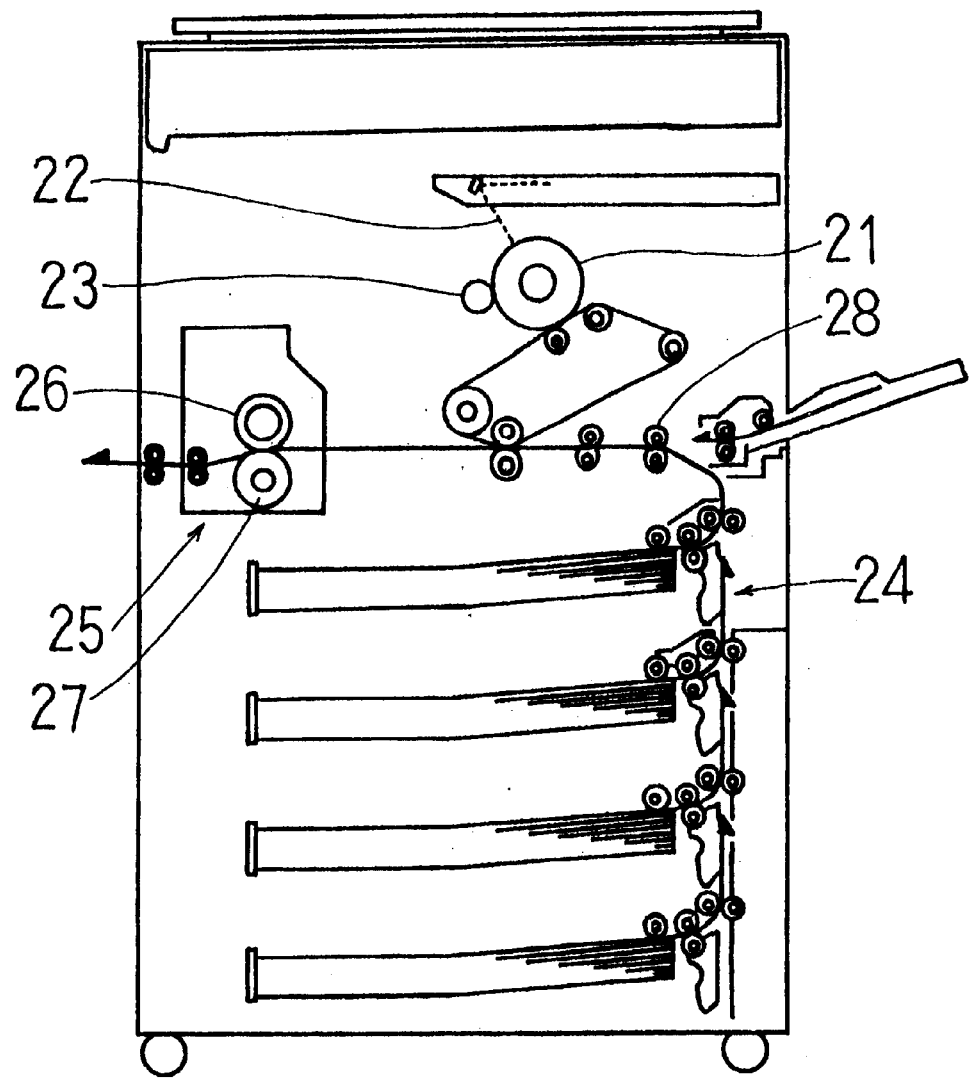
FIG. 10 shows a definition of $R_a$.
FIG. 11 is a sectional view of an ordinary electrostatic transfer copier.

FIG. 1 shows a deep groove ball bearing for supporting the photoconductor drum 21 (see FIG. 11) as an example of the rolling bearing. This deep groove ball bearing is chiefly composed of: an inner ring 1 to be fixed to a shaft-side member; an outer ring 2 to be fixed to a housing; balls 3, or rolling elements, interposed between a raceway surface 1a of the inner race 1 and a raceway surface 2a of the outer race 2; and a retainer 4 for retaining the balls 3 circumferentially at regular intervals. When used as a rolling bearing for supporting a photoconductor drum, the above-described deep groove ball bearing mainly employs a diameter series 8 (JIS 1512) for the sake of axial margins in radial design.

Among the bearing parts mentioned above, at least the inner race 1, outer race 2, and rolling elements 3 are formed of conductive metal material such as steel (for example, high-carbon chrome bearing steel). The bearing may be filled with any type of grease, including those sealed in ordinary bearings (typically insulative), while the present embodiment deals with the case of using a fluorine type grease which is excellent in high temperature properties. Aside from the grease lubrication, oil lubrication may be adopted. Current-carrying greases can also be used for yet higher current-carrying capability.

Figure 2:
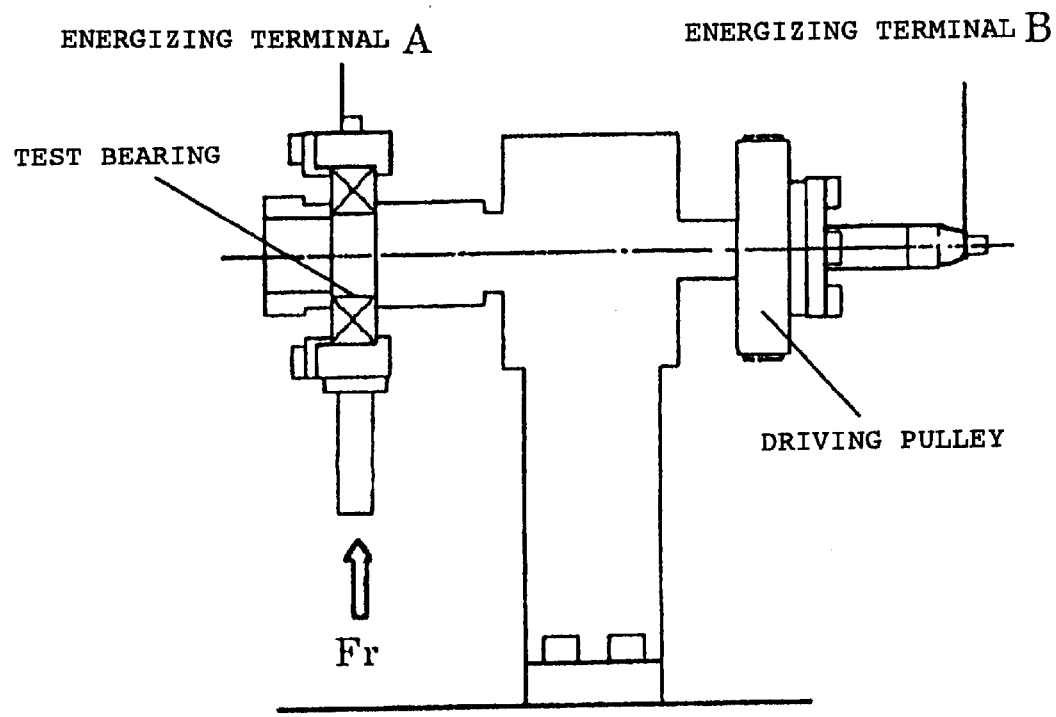
FIG. 2 is a front view showing an insulation resistance measuring system.
Figure 3:
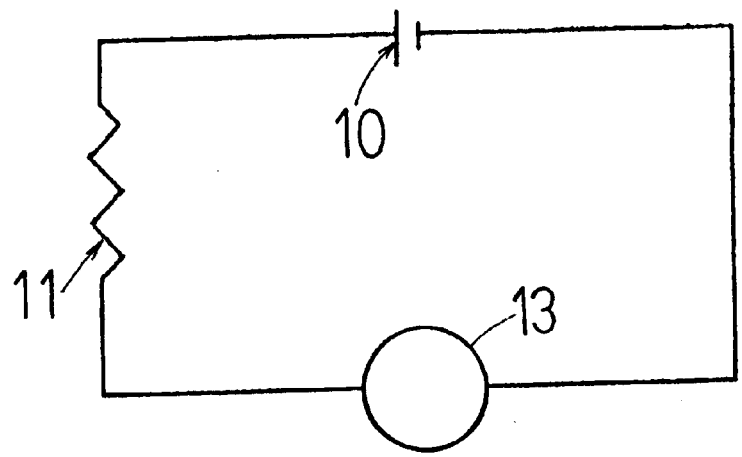
FIG. 3 is a circuit diagram for insulation resistance measurement.
Figure 4:
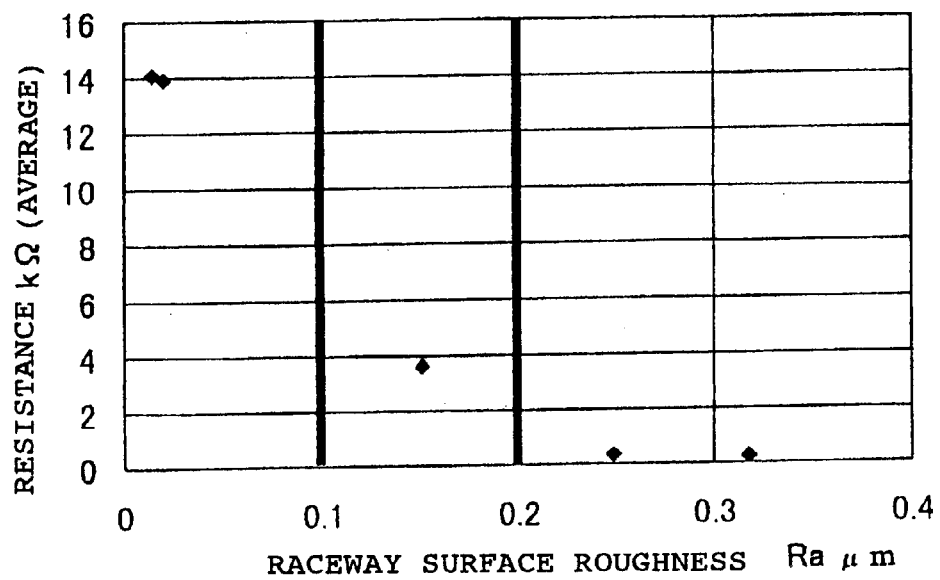
FIG. 4 is a chart showing the measurements.

FIG. 4 shows the measurements of insulation resistance obtained from prototypes of the above-described thin deep groove ball bearing (diameter series 8), having inner and outer raceway surfaces 1a and 2a of different surface roughnesses $R_a$ (center line average heights). FIGS. 2 and 3 show the measuring system and measuring circuit. As shown in FIG. 3, the measuring circuit consists of a power supply 10, a control resistance 11, and a test bearing 13. The measurements were made under the following conditions: the number of revolutions of 200 rpm; a radial load Fr=4.9 N; a control resistance of 300 kΩ; and a power supply voltage of 30 V. Incidentally, the horizontal axis of FIG. 4 indicates the surface roughnesses $R_a$ of the inner raceway surface 1a and the outer raceway surface 2a in average.

It is seen from FIG. 4 that the bearing' insulation resistance drops significantly at surface roughnesses 20 exceeding approximately 0.1 μm. The reason for this seems to be that the rate of metal contact between the rolling contact surfaces (raceway surfaces 1a, 2a) and the surfaces of the balls 3 rises with increasing $R_a$. Accordingly, the raceway surfaces 1a and 2a preferably have a surface roughness of 0.1 μm or higher, and more desirably of 0.2 μm or higher. Here, the surface roughness $R_a$ higher than those of conventional articles ($R_a$=0.02 μm or so) makes it possible to omit the grinding of the raceway surfaces 1a and 2a to utilize the as-cut surfaces, or simplify the grinding. When the grinding is omitted, heat treatment after the cutting leaves discolored surfaces (for example, blackened surfaces) on the product. This allows easy visual discrimination from ordinary grounded products.

It is also expected from FIG. 4 that the resistance starts to drop at $R_a$ below 0.1 μm. This seems ascribable to the fact that the surface roughness is evaluated in terms of the center line average height $R_a$, for some metal contact starts to occur before $R_a$=0.1 μm albeit with rather small frequency.

Now, FIG. 5 shows the calculations of the oil film thicknesses in the same bearings as those used in the measurement of FIG. 4, calculated by Archard-Cowking equation shown to the top in FIG. 9. The calculations were made with different radial clearances and different operating temperatures, on both inner- and outer-race sides. The lower the operating temperature, the higher the base oil viscosity of the grease becomes to increase the theoretical oil film thickness. Incidentally, the double sign in the equation refers to the inner and outer rings with its upper and lower signs, respectively.

It is found from a comparison between FIGS. 4 and 5 that the surface roughness $R_a$ (μm) of the raceway surfaces 1a, 2a and the theoretical value of the oil film thickness (μm) preferably have a ratio [surface roughness $R_a$/oil film thickness] of 0.3 or higher, and more desirably of 0.6 or higher.

Figure 6:
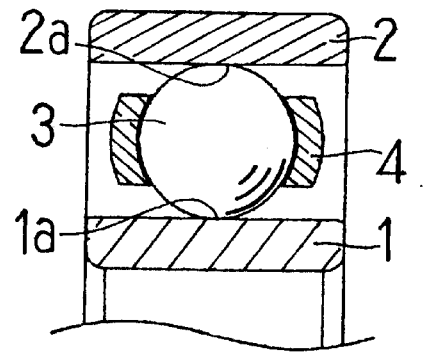
FIG. 6 is a sectional view showing another embodiment of the present invention.
Figure 7:
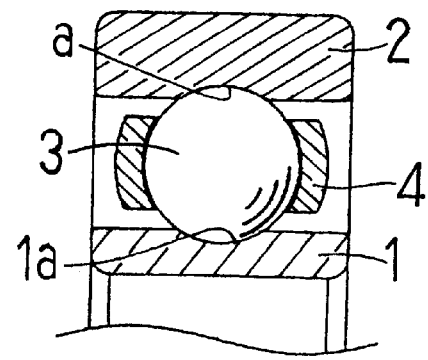
FIG. 7 is a sectional view showing another embodiment of the present invention.
Figure 8:
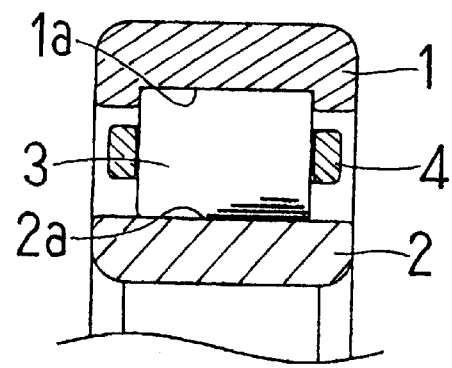
FIG. 8 is a sectional view showing another embodiment of the present invention.

FIGS. 6–8 show other embodiments of the present invention, any of which is intended to support a photoconductor drum.

FIG. 6 shows a deep groove ball bearing in which inner and outer raceway surfaces 1a and 2a are formed into flat surfaces (the radius of curvature: ∞). A bearing for supporting e.g. a photoconductor drum sometimes has only to receive purely radial light loads. In such cases, even the raceway surfaces 1a, 2a formed like the shown flat surfaces are sufficiently applicable in practical use. Accordingly, it is possible to omit the grooving to the raceway surfaces 1a, 2a for further cost reduction. Here, seals (not shown) attached to both ends of the bearing can prevent the inner ring 1 and the outer ring 2 from slipping off.

FIG. 7 shows a bearing having an outer ring 2 thicker than those of ordinary products. Some bearings for use with rolls in copiers, printers, and the like are not installed into such a cylindrical housing as supports the periphery of their outer ring 2, but fitted into a thin steel plate or even held at the top and bottom alone. In the latter case, the bearing carries a load only across the top and bottom for support, and therefore its outer ring 2, if it is of thin type, can possibly be deformed into an oval shape. As a countermeasure against this, the outer ring 2 is increased in thickness to enhance the outer ring strength as compared with thin products.

FIG. 8 shows a roller bearing using rollers 3 as the rolling elements (a cylindrical roller bearing, in the shown example). Here, the rollers 3 and the raceway surfaces 1a, 2a make line contact. Therefore, the oil film thicknesses are better calculated by Grubin equation shown to the lower in FIG. 9.

The present invention is applicable to all the types of bearings exemplified in FIGS. 6–8, with excellent current-carrying capability and lower costs.

Note that while it is suitably applicable to photoconductor-drum bearings to be incorporated into information equipment for electrophotographic processing (such as copiers and printers), the present invention is of course not limited to these applications. For example, in the information equipment mentioned above, rolling bearings according to the present invention can also be used to support rollers other than the photoconductor drum 21 shown in FIG. 11 (a plurality of paper feed rollers (28, for example), the fixing roller 26, the pressure roller 27, and the developing drum 23).

As has been described above, according to the present invention, a rolling bearing having excellent current-carrying capability can be provided at extremely low cost. Besides, it is possible to omit or simplify the step of grinding surfaces that make rolling contact with mating members. As a result, a decrease in man-hour allows further cost reduction. Moreover, in the cases where the cutting is followed by heat treatment, the heat treatment can produce discolored surfaces which are left intact for easy visual discrimination from ordinary ground products.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A rolling bearing comprising an inner ring, an outer ring, and a plurality of rolling elements arranged between said inner and outer rings, oil films being interposed between said rolling elements and raceway surfaces of said rings, wherein said inner raceway surface or said outer raceway surface comes into metal contact with said rolling elements for electric connection, and wherein said rolling bearing is applied to a ball bearing.

2. A rolling bearing comprising an inner ring, an outer ring, and a plurality of rolling elements arranged between said inner and outer rings, oil films being interposed between said rolling elements and raceway surfaces of said rings, wherein said inner raceway surface or said outer raceway surface is equal to or higher than 0.1 $\mu$m in surface roughness $R_a$, and wherein said rolling bearing is applied to a ball bearing.

3. The rolling bearing according to claim 1 or 2, wherein the surface roughness $R_a$ ($\mu$m) of said inner or outer raceway surface and an oil film thickness ($\mu$m) calculated by Archard-Cowking equation have a ratio of 0.3 or higher.

4. The rolling bearing according to claim 1 or 2, used to support a photoconductor drum in information equipment for electrophotographic processing.

* * * * *